United States Patent [19]

Anderson

[11] 4,429,228

[45] Jan. 31, 1984

[54] HIGH EFFICIENCY PHOTOIONIZATION DETECTOR

[76] Inventor: David F. Anderson, 3055 Trinity, Los Alamos, N. Mex. 87544

[21] Appl. No.: 262,833

[22] Filed: May 12, 1981

[51] Int. Cl.³ .............................................. G01T 1/18
[52] U.S. Cl. .................................. 250/374; 250/361 R
[58] Field of Search ............... 250/374, 375, 385, 389, 250/361 R; 313/93, 223; 252/181.1

[56] References Cited

PUBLICATIONS

Charpak et al., "The Photo-Ionization Proportional Scintillation Chamber," IEEE Trans. Nucl. Sci., NS-27, No. 1, pp. 212-215, Feb. 1980.
Ku et al., "Properties of an Imaging Gas Scintillation Proportional Counter," pp. 1-5, Columbia Astrophysics Laboratory.

Primary Examiner—Davis L. Willis
Attorney, Agent, or Firm—Flynn, Thiel, Boutell & Tanis

[57] ABSTRACT

A high efficiency photoionization detector using tetraaminoethylenes in a gaseous state having a low ionization potential and a relative photoionization cross section which closely matches the emission spectrum of xenon gas. Imaging proportional counters are also disclosed using the novel photoionization detector of the invention. The compound of greatest interest is TMAE which comprises tetrakis(dimethylamino)ethylene which has a measured ionization potential of 5.36±0.02 eV, and a vapor pressure of 0.35 torr at 20° C.

9 Claims, 6 Drawing Figures

HIGH EFFICIENCY PHOTOIONIZATION DETECTOR

This invention is a result of a contract with the Department of Energy (Contract No. W-7405-ENG-36).

BACKGROUND OF THE INVENTION

The present invention pertains generally to measuring and testing devices and more particularly to photoionization detectors.

For the past few years, there has been a great deal of effort devoted to developing an improved device for detecting ultraviolet light such as disclosed by A. Policarpo, Nucl. Instr. and Meth. 153, 389 (1978); G. Charpak et al., IEEE Trans. Nucl. Sci. NS-27, 212 (1980); and D. F. Anderson, IEEE Trans. Nucl. Sci. NS-27, 181 (1980). The primary interest in developing an improved ultraviolet light detector is for the purpose of replacing photomultiplier tubes used in conjunction with xenon filled gas scintillation proportional counters for detecting x-ray radiation. Additionally, there has also been considerable interest in developing an instrument to detect Cerenkov radiation as more fully disclosed in G. Melchart et al., IEEE Trans. Nucl. Sci. NS-27, 124 (1980).

Since the emission spectrum of xenon in xenon filled gas scintillation proportional counters is in the ultraviolet, ranging from approximately 1500–1900 Å and peaking at about 1670 Å, photomultiplier tubes with Spectrosil windows have typically been used in conjunction with xenon filled gas scintillation proportional counters for detecting uv photons. In other words, x-rays impinging upon the gas scintillation proportional counter produce ultraviolet photons which are converted by photomultiplier tubes into an electrical signal representative of the energy of the x-ray radiation. These devices have been particularly useful in detecting, and in some cases imaging, low energy x-ray radiation ranging from approximately 0.5 keV to 30 keV.

Although other techniques have been suggested for replacing photomultiplier tubes to detect the ultraviolet light produced by the xenon gas in gas scintillation proportional counters, the most promising device has been the photoionization detector. The photoionization detector is a proportional counter which is filled with an appropriate gas that converts incident ultraviolet photons produced by the gas scintillation proportional counter to electrons through the photoelectric effect. The coupling of a photoionization detector to a gas scintillation proportional counter was first disclosed by Policarpo in Nucl. Instr. and Meth. 153, 389 (1978), wherein he suggests that if a sufficient fraction of the ultraviolet photons produced by the gas scintillation proportional counter can be detected in the photoionization detector, a substantial improvement in energy resolution is possible.

The advantages of the photoionization detector over photomultiplier tubes for detecting light from xenon gas scintillation proportional counters are numerous. Photoionization detectors can be constructed with any desired dimensions and with a variety of uv windows. Additionally, photoionization detectors are more rugged and compact than photomultiplier tubes and can be constructed at a lower cost than photomultiplier tubes having equivalent window areas. Moreover, photoionization detectors are "solar blind," i.e., insensitive to visible radiation, eliminating the problem of light leaks which are prevalent in photomultiplier tube detectors. Furthermore, photoionization detectors find utility in high or varying magnetic fields where gas scintillation proportional counters have been shown to be useful, such as disclosed in M. Fatima et al., IEEE Trans. Nucl. NS-27, 208 (1980), but where photomultiplier tubes have not produced reliable outputs. Additionally, photomultiplier tubes have been found to have a nonuniform quantum efficiency across the window of the photomultiplier tube which causes incorrect data measurements in many cases.

The photoionization detector, on the other hand, has a highly uniform quantum efficiency across the window face, resulting in highly uniform and accurate measurements of data. Moreover, with the use of an imaging photoionization detector, such as disclosed by W. Ku et al., IEEE Transaction NS-28, 830 (1981) and similar to the imaging proportional counters disclosed by P. B. Reid et al., IEEE Trans. Nucl. Sci. NS-26, 46 (1979) and G. Charpak et al., Nucl. Instr. and Meth. 148, 471 (1978), event locations can be determined with high accuracy, for imaging Cerenkov radiation and producing imaging gas scintillation proportional counters.

Charpak, Policarpo, and Sauli have demonstrated a gas scintillation proportional counter coupled to a photoionization detector as disclosed in G. Charpak et al., IEEE Trans. Nucl. Sci. NS-27, 212 (1980). As disclosed therein, a krypton gas scintillation proportional counter was coupled to a photoionization detector filled with 83% argon, 3% TEA (triethylamine), and 14% methane. Although the energy resolution obtained was good (10.8% FWHM at 5.9 keV), a krypton gas scintillation proportional counter has limited applications due to its poor x-ray stopping power and high radioactive background from $^{85}Kr$. Additionally, the photoionization potential of TEA is too high for the detection of xenon light and use of krypton and TEA requires windows such as $LiF_2$ and $MgF_2$ which are difficult to work with and expensive.

SUMMARY OF THE INVENTION

It is therefore an object of the present invention is to provide an improved photoionization detector.

It is also an object of the present invention to provide a high efficiency photoionization detector.

Another object of the present invention to provide a detection gas for use in a photoionization detector.

Another object of the present invention to provide a low ionization potential detection gas for use in a photoionization detector.

Another object of the present invention is to provide a detection gas for use in a photoionization detector which has a photoionization cross-section sensitive to the emission spectrum of xenon gas.

Another object of the present invention is to provide a detection gas for use in a photoionization detector for converting incident ultraviolet photons to electrons.

Another object of the present invention is to provide an imaging photoionization detector.

Another object of the present invention is to provide a detection gas for a imaging photoionization detector.

Another object of the present invention is to provide a detection gas for an imaging photoionization detector for converting ultraviolet photons generated by a gas scintillation proportional counter to electrons.

Another object of the present invention is to provide a device for detecting x-rays.

Another object of the present invention is to provide a device for generating an electrical signal representative of an image of a source of x-rays.

To achieve the foregoing and other objects, and in accordance with the purposes of the present invention, as embodied and broadly described herein, the apparatus of this invention may comprise a detection gas for use in a photoionization detector comprising a tetraaminoethylene having an ionization potential below 6.22 eV.

The present invention may also comprise, in accordance with its objects and purposes, a detection gas for a photoionization detector for converting incident ultraviolet photons to electrons comprising at least in part tetrakis(dimethylamino)ethylene.

The present invention may also comprise, in accordance with its objects and purposes, a detection gas for an imaging photoionization detector for converting ultraviolet photons generated by a gas scintillation proportional counter to electrons comprising at least in part tetrakis(dimethylamino)ethylene.

The present invention may also comprise, in accordance with its objects and purposes, a device for detecting x-rays comprising gas scintillation proportional means for generating ultraviolet photons in response to said x-rays; photoionization detector means disposed proximate to said gas scintillation proportional counter for converting said ultraviolet photons generated by said gas scintillation proportional counter to electrons using a detection gas comprising at least in part tetrakis(dimethylamino)ethylene.

The present invention may also comprise, in accordance with its objects and purposes, a device for generating an electrical signal representative of an image of a source of x-rays comprising an x-ray imaging device; gas scintillation proportional counter means for generating ultraviolet photons in response to x-rays imaged by said x-ray imaging device; said gas scintillation proportional counter means disposed at the focal plane of said x-ray imaging device; imaging photoionization detector means for converting said ultraviolet photons to an electrical signal representative of an image of said source of x-rays using a detection gas comprising at least in part tetrakis(dimethylamino)ethylene, said imaging proportional counter means disposed proximate to said gas scintillation proportional counter means.

The present invention therefore provides a photoionization detector which is inexpensive and easy to construct, is capable of providing highly accurate outputs, demonstrates a substantial improvement in energy resolution over photomultiplier tubes, is more rugged and compact than photomultiplier tubes, can be constructed with almost any desired dimension or window configuration, is insensitive to visible radiation, can be used in high or varying magnetic fields, has a uniform quantum efficiency across its window face, is capable of giving event locations with high accuracy, is useful in imaging Cerenkov radiation, uses inexpensive and easy to work with parts, and can be used in conjunction with a xenon gas scintillation proportional counter since its photoionization cross section matches well with the emission spectrum of xenon gas, and consequently, avoids the problems of stopping power of krypton gas scintillation proportional counters.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings.

DETAILED DESCRIPTION OF THE PREFERRED EMBODIMENT OF THE INVENTION

Figure 1:
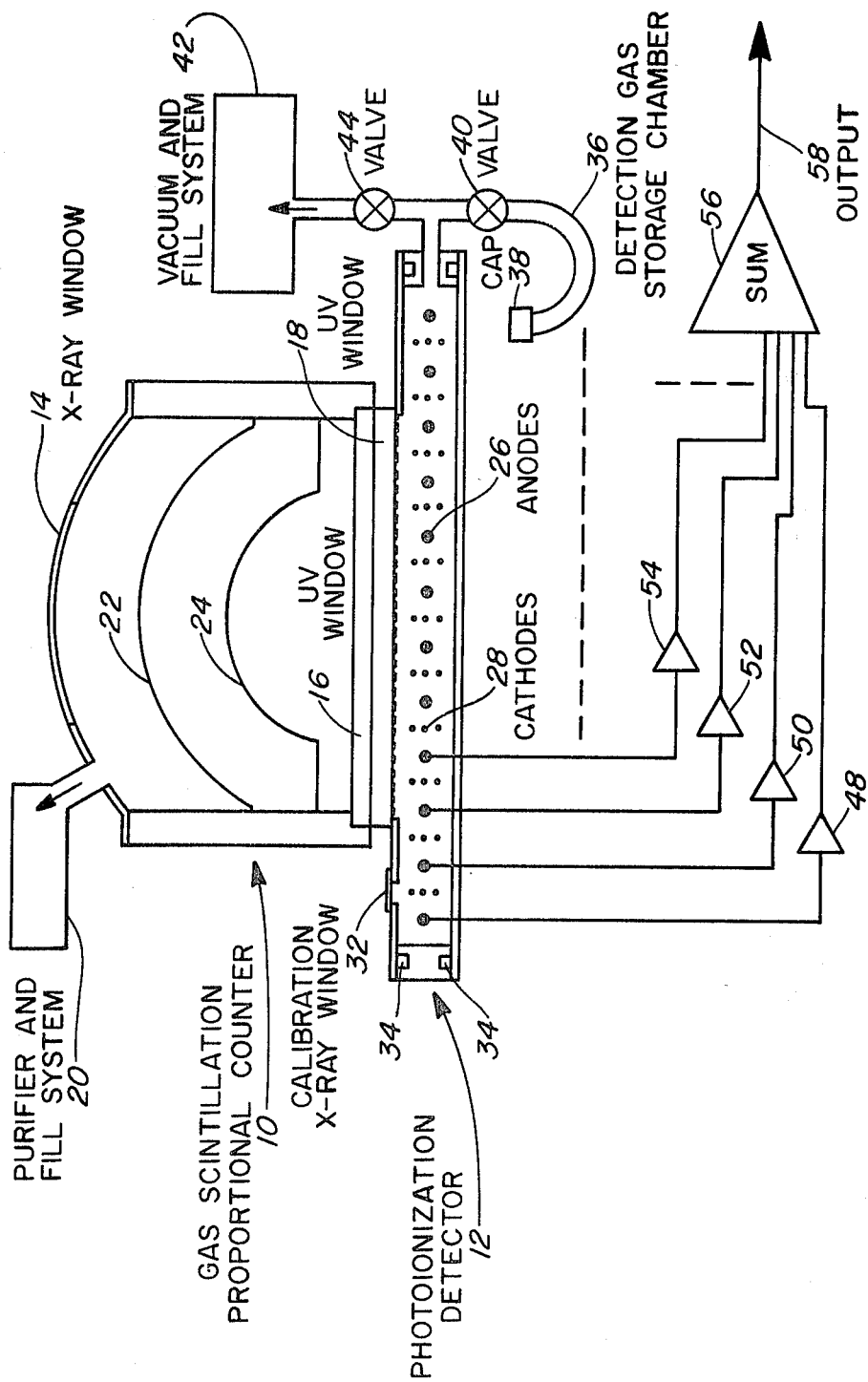
FIG. 1 is a schematic illustration of a combined gas scintillation proportional counter and photoionization detector.

FIG. 1 is a schematic illustration of the combined gas scintillation proportional counter 10 and photoionization detector 12 of the present invention. In accordance with the present invention, photoionization detector 12 utilizes a detection gas comprising a tetraaminoethylene having an ionization potential below essentially 6.22 eV which, in accordance with the preferred embodiment of the invention, comprises tetrakis(dimethylamino)ethylene which is known as TMAE (pronounced "Tammy"). The detection gas can also comprise other tetraaminoethylenes such as 1,1',3,3'-tetramethyl-2,2'-biimidazolidinylidene (TMBI), 1,1,4,4-tetrakis(dimethylamino)butadiene (TMAB), and N,N,N',N'-tetramethyl-p-phenylenediamine (TMPD), which constitute less desirable gases than TMAE.

As illustrated in FIG. 1, the gas scintillation proportional counter 10 is a sealed curved grid counter similar to instruments such as disclosed by D. F. Anderson, Thesis, Columbia University (1978). The gas scintillation proportional counter 10 has a x-ray window 14 which can comprise beryllium and 4.8 thick Spectrosil windows 16 and 18 to pass ultraviolet photons. Purifier and fill system 20 provide 760 torr of research grade xenon. Gas purity can be maintained by a getter such as SAES model ST171/HI/16-10/300. Grids 22 and 24 are biased with voltages which are typically 300 V and 7.5 kV, respectively.

The photoionization detector illustrated in FIG. 1 is a multiwire proportional counter consisting of 12 square cells, 13 millimeters on a side and 15 cm long. Anodes 26 are 20 micron gold-coated stainless steel wires connected at one end to form a single sensor. Cathodes 28 are 76 micron gold-coated stainless steel. Ultraviolet windows 16 and 18 comprise 96.5 mm diameter Spectrosil plates which together have a thickness of 4.8 mm. A grounded wire mesh 30 is placed under uv window 18 to complete the cathode plate. A calibration x-ray window 32 is made of 13 micron aluminized Kapton to test the performance of the photoionization detector directly with an x-ray source. The photoionization detector 12 is assembled with Viton o-rings 34 to maintain the TMAE gas. The detection gas is stored in a detection gas storage chamber 36 which comprises a capped stainless steel tube 38 and valve 40. A vacuum and fill system 42 is controlled by valve 44. The photoionization detector 12 is assembled without use of optical grease. The photoionization detector 12 is filled with TMAE and 380 torr of P-10.

A useful parameter for describing the performance of the combined gas scintillation proportional counter 10 and photoionization detector 12, which is hereinafter referred to as a Scinprop, is:

$$\eta = P_1/P_2$$

Here, $P_1$ is the signal pulse height for x-ray events in the gas scintillation proportional counter 10 and $P_2$ is the pulse height when the same energy x-rays are detected by the photoionization detector directly, that is, when the photoionization detector is used as a standard proportional counter.

The mean energy per ion pair for argon-TMAE mixtures has been measured to be about 21 eV by F. Sauli at CERN. This constitutes a significant improvement over the 26.0 eV per ion pair reported for argon-methane mixtures. Thus, the number of ultraviolet photons detected per x-ray event is:

$$N = 281 \, \eta \text{(at 5.9 keV)}.$$

Figure 2:
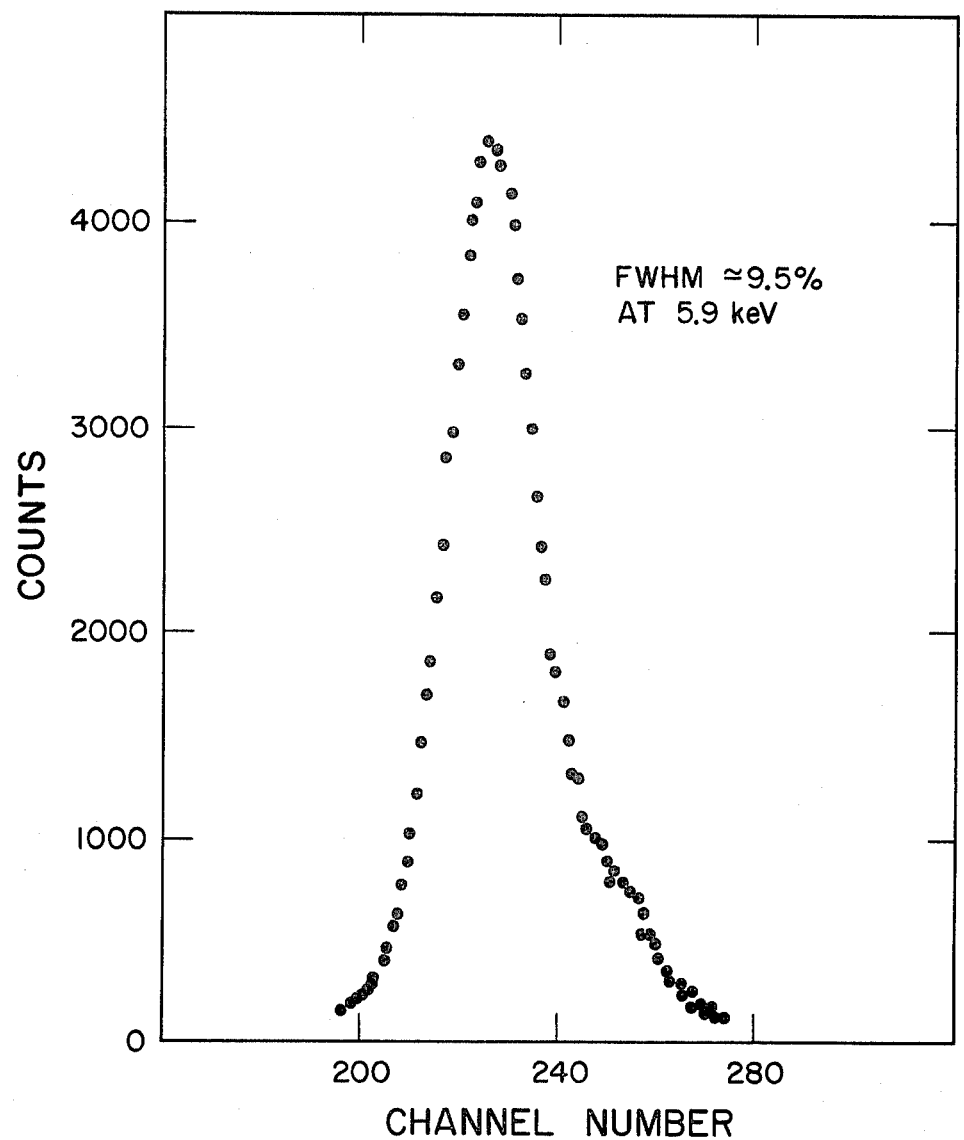
FIG. 2 is a graph illustrating the resolution of the device at the present invention.

For voltage settings of 300 V and 7500 V on gas scintillation proportional counter grids 22 and 24, respectively, and 900 V on the photoionization detector anodes 26, $\eta$ typically equals 10 for different fillings, although earlier fillings gave values of $\eta$ as low as 0.3 when the TMAE gas had not been adequately purified. Thus, about 2800 photons were detected per 5.9 keV x-ray event. Using a $^{55}$Fe source, the best resolution measured was 9.5% FWHM, as shown in FIG. 2.

To determine the quantum efficiency of TMAE, the number of photons detected by the photoionization detector was compared to the number of photons detected by a photomultiplier tube. From the work reported by D. F. Anderson et al., Nucl. Instr. and Meth. 163, 125 (1979), using the same gas scintillation proportional counter design and gas pressure, and a photomultiplier tube, it was found that about 880 photons were detected per 5.9 keV x-ray event, with a potential between the grids of the gas scintillation proportional counter of 4050 V. The bialkali photocathode used had a quantum efficiency of about 24% between 1700-1950 Å, with a reduction in the photomultiplier tube quantum efficiency due to the Spectrosil window. For the photoionization detector, which is a window similar to that of the photomultiplier tube, the average of the two measurements made at the same gas scintillation proportional counter voltage settings is $\eta = 4$. Thus, about 1120 photons are detected per 5.9 keV x-ray event. This would imply that about 30% of the ultraviolet photons entering the photoionization detector are detected. These measurements indicate that the absolute quantum efficiency of TMAE to the Spectrosil-xenon spectrum is about 60%, which is much higher than the photomultiplier tube efficiency.

Figure 3:
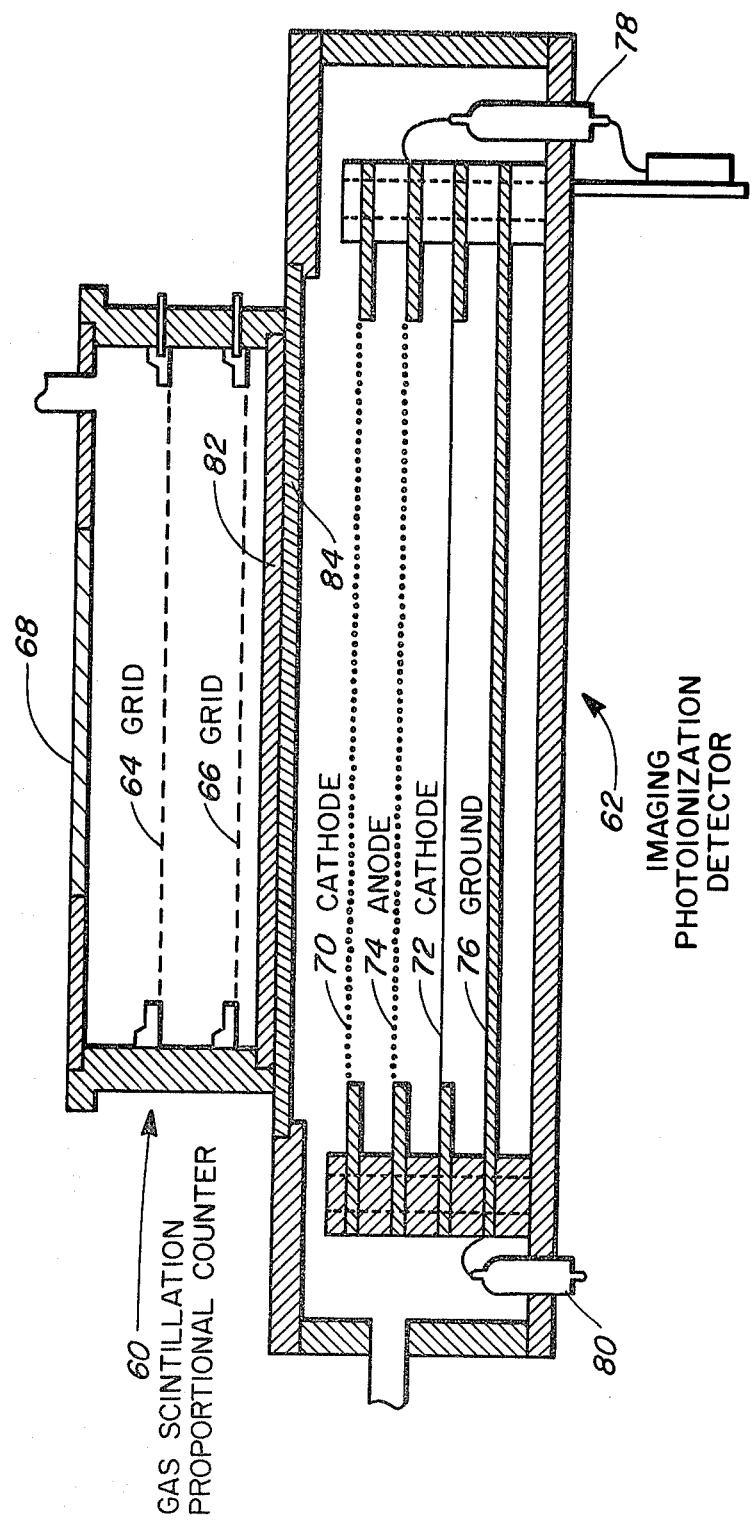
FIG. 3 is a schematic cross-sectional diagram of a gas scintillation proportional counter coupled to an imaging photoionization detector.

FIG. 3 is a schematic cross-sectional diagram of a gas scintillation proportional counter 60 coupled to a imaging photoionization detector 62. The device illustrated in FIG. 3 combines the good energy resolution of gas scintillation proportional counters with the position sensitivity of imaging photoionization detectors. The gas scintillation proportional counter 60 of FIG. 3 is similar to gas scintillation proportional counter 10 of FIG. 1 with the exception that gas scintillation proportional counter 60 utilizes flat grids 64 and 66 rather than curved grids 22 and 24, as illustrated in FIG. 1.

Imaging photoionization detector 62 has two cathodes 70 and 72 and one anode plane 74. The anode 74 and both cathodes 70 and 72 comprise a series of wires which run parallel to one another and which are mounted on a frame. A series of feedthrough connectors, such as feedthrough connector 78 and 80, connect the outputs of cathodes 70 and 72 and anode 74 to the exterior of imaging photoionization detector 62. A solid metal sheet provides a ground 76. Ultraviolet windows 82 and 84 transmit uv photons produced by gas scintillation proportional counter 60 into imaging photoionization detector 62.

Figure 4:
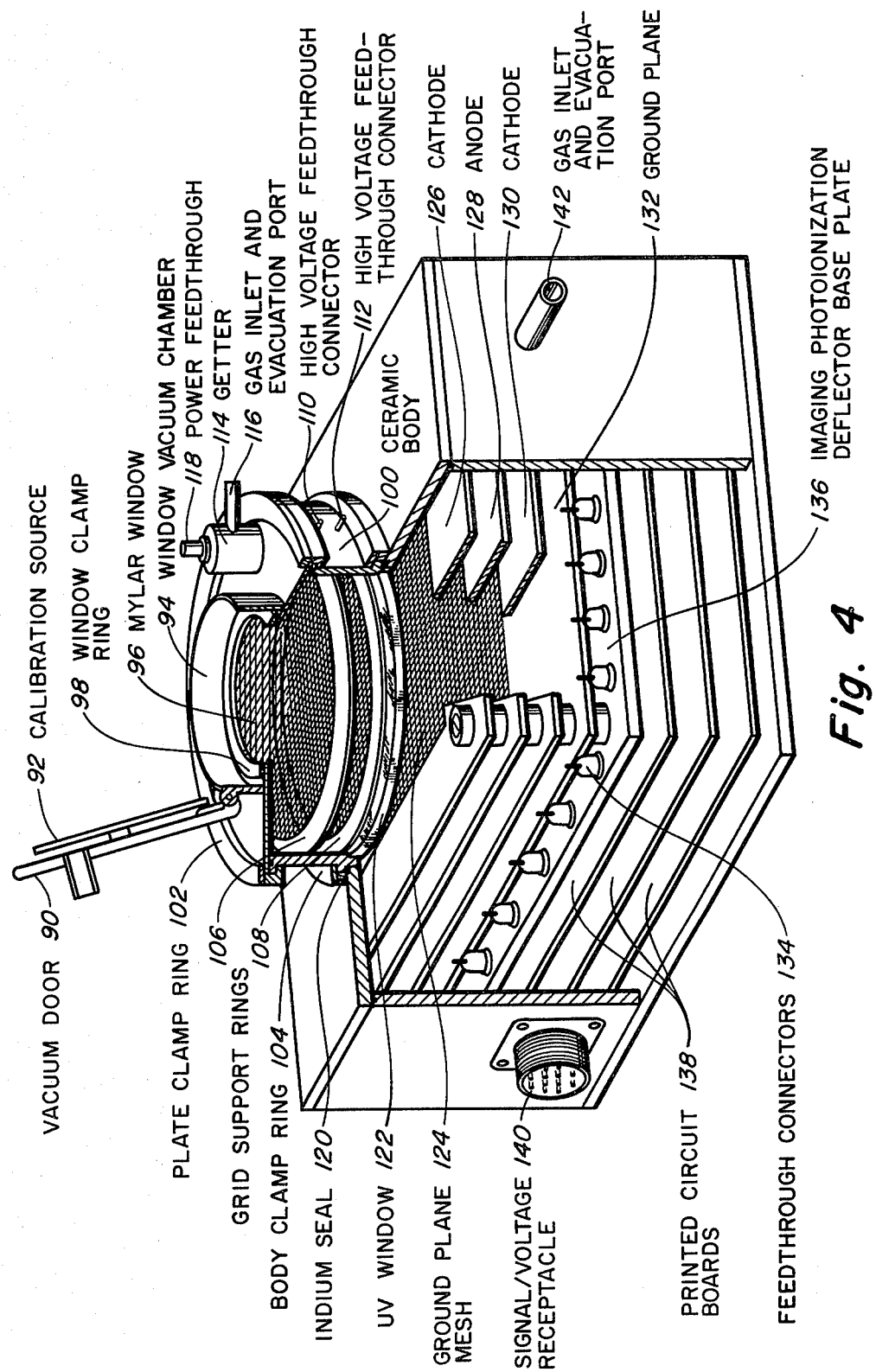
FIG. 4 is a schematic cutaway perspective view of a combined gas scintillation proportional counter and imaging photoionization detector.

FIG. 4 is a schematic cutaway perspective view of a combined gas scintillation proportional counter and imaging photoionization detector similar to the device illustrated in FIG. 3. The gas scintillation proportional counter has a vacuum door 90 which has a calibration source 92 connected thereto. Vacuum door 90 is pivotally attached to window vacuum chamber 94 which has a mylar window 96 disposed therein which is attached by window clamp ring 98. For x-ray energies above a few kilovolts, a Be window may be used without a vacuum chamber. The entire assembly is attached to a ceramic body 100 via plate clamp ring 102 and body clamp ring 104. Disposed within the gas scintillation proportional counter are two grids supported by grid support rings 106 and 108. These grids are connected to a high voltage electrical source via high voltage feedthrough connectors 110 and 112. Getter 114 purifies the gas of the gas scintillation proportional counter. Getter 114 has a gas inlet and evacuation port 116 and power feedthrough 118 connected thereto. Indium seal 120 seals the gas scintillation proportional counter from the outside atmosphere. Ultraviolet window 122 provides a seal between the gas scintillation proportional counter and the imaging photoionization detector, illustrated in FIG. 4, and also transmits uv photons generated in the gas scintillation proportional counter into the imaging photoionization detector.

The imaging photoionization detector has a ground plane mesh 124 which is disposed directly under uv window 122. Cathode 126 is supported by a frame structure and consists of a series of closely spaced parallel wires. Anode 128 comprises essentially the same structure as cathode 126. Additionally, the wires of anode 128 run in the same direction as the wires of cathode 126. Cathode 130 also comprises a frame structure with a series of closely spaced parallel wires connected thereto. However, the wires of cathode 131 run in a direction normal to the wires of cathode 126 and anode 128. Ground plane 132 comprises a metal sheet which provides a ground for the imaging photoionization detector. Feedthrough connectors 134 are mounted on the imaging photoionization detector base plate 136. Feedthrough connectors 134 provide an electrical feedthrough from cathode 126, anode 128, and cathode 130 to the amplifiers and signal processing circuitry mounted on printed circuit boards 138. Signal voltage receptacle 140 provides an output for the electrical signal representative of the image of a source of x-rays. Gas inlet and evacuation port 142 provides the detection gas to the imaging photoionization detector, of which TMAE is the most suitable.

In operation, the combined device of FIG. 4 detects low energy x-ray radiation in the range of 0.5 keV to 30 keV through mylar window 96. Xenon gas contained within the gas scintillation proportional counter section of the device of FIG. 4 produces uv photons in response to the low energy x-ray radiation. The uv photons are transmitted by uv window 122 into the imaging photoionization detector. In the imaging photoionization detector, the TMAE gas has a low ionization potential and causes the uv photons from the gas scintillation proportional counter to avalanche and produce induced pulses on cathodes 126 and 130 and anode 128. Cathodes 126 and 130 and anode 128 can be electrically connected in any desired manner to provide an image of the x-ray source. For example, cathode 126 can provide the location of the detected x-ray event in the X direction, while cathode 130 can provide the location of the x-ray event in the Y direction. Anode 128 can then provide information as to the energy of the detected x-ray. An imaging device can then be connected to signal voltage receptacle 140 to reconstruct an image of the x-ray source.

For photoionization detectors and Scinprops to be useful, a gas is required which has a low ionization potential, a high quantum efficiency for ultraviolet light, and adequate vapor pressure. Of the organic compounds reported to date, the tetraaminoethylenes have the lowest ionization potentials, such as disclosed in Y. Nakato et al., Bulletin of the Chemical Society of Japan 47, 3001 (1974); C. E. Waring et al., The Journal of Physical Chemistry 80, 1025 (1976); Y. Nakato et al., The Journal of Physical Chemistry 76, 2105 (1972); Y. Nakato et al., Bulletin of the Chemical Society of Japan 45, 1299 (1972); and M. Hori et al., Spectrochimica Acta 24A, 1397 (1968). Table I gives the photoionization potential in the gas phase ($I_g$) and the photocurrent threshold ($E_{th}$) for tetraaminoethylenes which comprise the following compounds: tetrakis(dimethylamino)ethylene (TMAE), 1,1',3,3'-tetramethyl-2,2'-biimidazolidinylidene (TMBI), 1,1,4,4-tetrakis(dimethylamino)butadiene (TMAB), N,N,N',N'-tetramethyl-p-phenylenediamine (TMPD). The measurements of Table 1 were taken with these compounds dissolved in tetramethylsilane (TMS). [See, Y. Nakato et al., Bulletin of the Chemical Society of Japan 47, 3001 (1974).] TEA is included as a reference. [See, G. Charpak et al., IEEE Trans. Nucl. Sci. NS-27, 212 (1980).]

Another group that may prove useful in the detection of ultraviolet light is the organo-metallic compounds known as the ocenes which have low ionization potentials and, possibly, acceptable vapor pressures. [See, M. Dufour et al., Appl. Phys. 9, 83 (1976).]

TABLE 1

Values of Photoionization Potentials of Various Compounds in the Gas Phase and Their Photocurrent Threshold Dissolved in TMS

| Compound | $I_g$ (eV) | Å | $E_{TH}$ (eV) |
|---|---|---|---|
| TMAE[a] | 5.36 ± 0.02 | 2313 | 3.54 ± 0.11 |
| TMBI[a] | 5.41 ± 0.02 | 2292 | 3.65 ± 0.11 |
| TMAB[a] | 5.60 ± 0.10 | 2214 | 3.83 ± 0.13 |
| TMPD[a] | 6.20 ± 0.02 | 2000 | 4.40 |
| TEA[b] | 7.5 | 1653 | |
| Cobaltocene[c] | 5.7 | 2175 | |
| Chromocene[c] | 6.0 | 2067 | |
| Nickelocene[c] | 6.7 | 1851 | |
| Ferrocene[c] | 6.8 | 1824 | |

[a]See Ref. 8,
[b]See Ref. 2,
[c]See Ref. 13.

Figure 5:
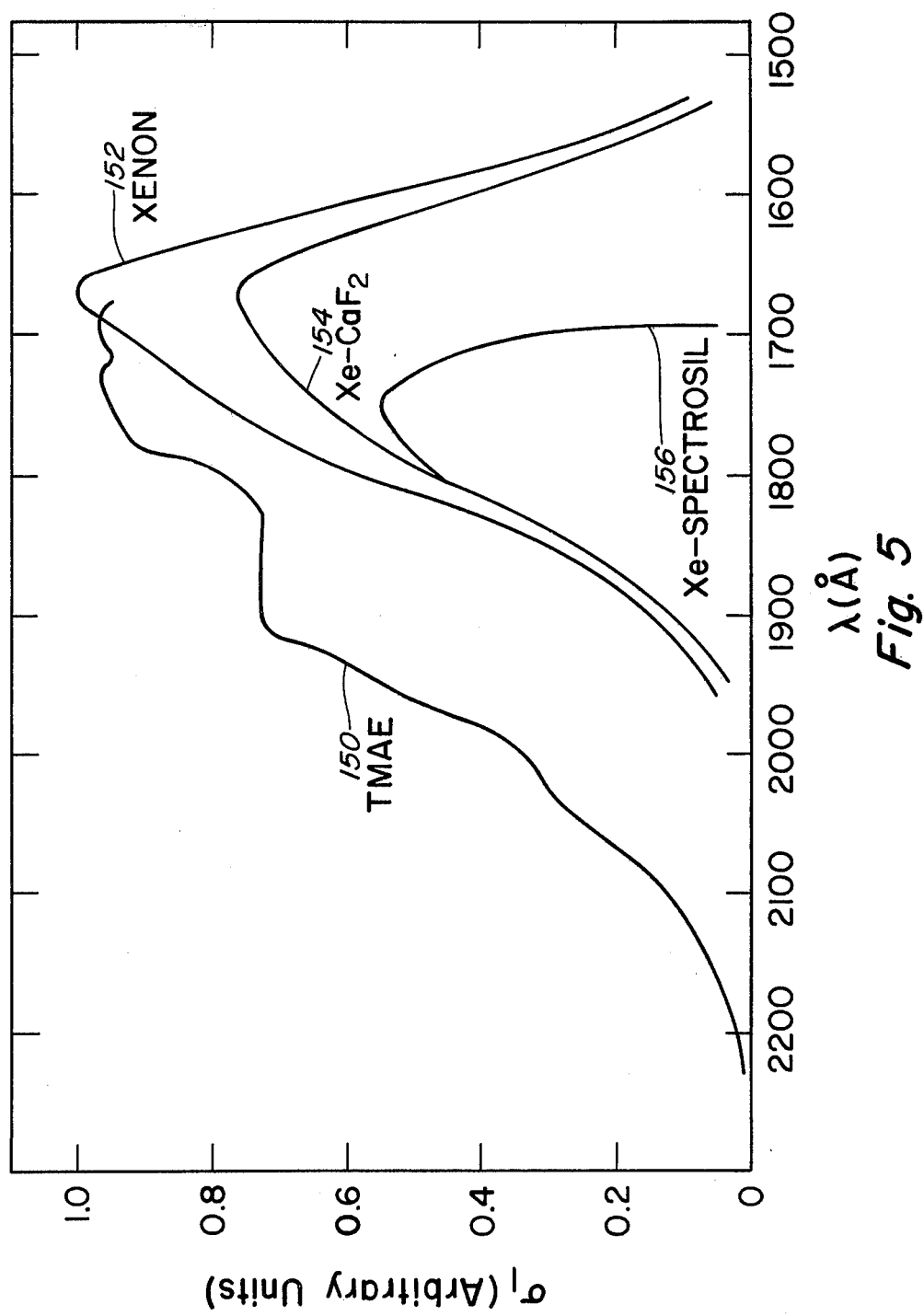
FIG. 5 is a graph illustrating the relative photoionization cross-section of TMAE and the emission spectrum of xenon gas.

The most promising of the tetraaminoethylene is TMAE. It has the lowest ionization potential and appears to be the most available. Nakato, Ozaki, and Tsubormura, as disclosed in Y. Nakato et al., Bulletin of the Chemical Society of Japan 45, 1299 (1972), have measured the relative photoionization cross-section of TMAE, as illustrated in FIG. 5, curve 150. As a reference, the emission spectrum of xenon gas is illustrated by curve 152 while the approximate xenon spectra after passing through a 4 mm thick Spectrosil window is illustrated in curve 154, as well as the xenon spectra after passing through a 5 mm thick $CaF_2$ window, which is illustrated by curve 156. The cross-section of TMAE is at a maximum over the Spectrosil-xenon spectrum. There are no TMAE cross-section data below 1675 Å, but it is likely that the cross-section of TMAE remains high over the entire xenon spectrum. It appears that the spectral response of TMAE is well matched to the $CaF_2$-xenon spectrum.

With regard to handling and purification of TMAE, TMAE has proved to be quite easy to work with if a few precautions are taken. Since TMAE reacts with oxygen in the air, the compound should be handled in an inert environment, although handling the compound in air seems to do little harm if it is later purified. TMAE, or its decay products, also react with such materials as vacuum grease and o-ring materials. The degradation of Viton has been found to be much less than that of Neoprene. TMAE does not seem to react with Teflon. Thus, in the design of an instrument, organic materials should be avoided. When these precautions are taken, the TMAE is stable.

There are several techniques for purifying TMAE:

Method 1

TMAE is shaken under nitrogen with a small amount of water and separated with a separating funnel. This is repeated until the water is clear. This procedure removes the oxidation products of tetramethyl oxide, tetramethyl urea, and dimethyl amine. The TMAE is then dried with a 4 Å or 5 Å molecular sieve. This method was developed by C. Heller, Naval Weapons Center, China Lake.

Method 2

Alumina may be added directly to the TMAE to remove the products of oxidation. [See, C. E. Waring et al., The Journal of Physiocal Chemistry 80, 1025 (1976).]

Method 3

Distillation. [See Y. Nakato et al., Bulletin of the Chemical Society of Japan 45, 1299 (1972).]

Method 4

TMAE is placed in a small bottle connected to an all-metal bellows valve. TMAE is then exposed to a vacuum until a noticeable amount (~10%) has been removed. The TMAE is then ready for use.

Figure 6:
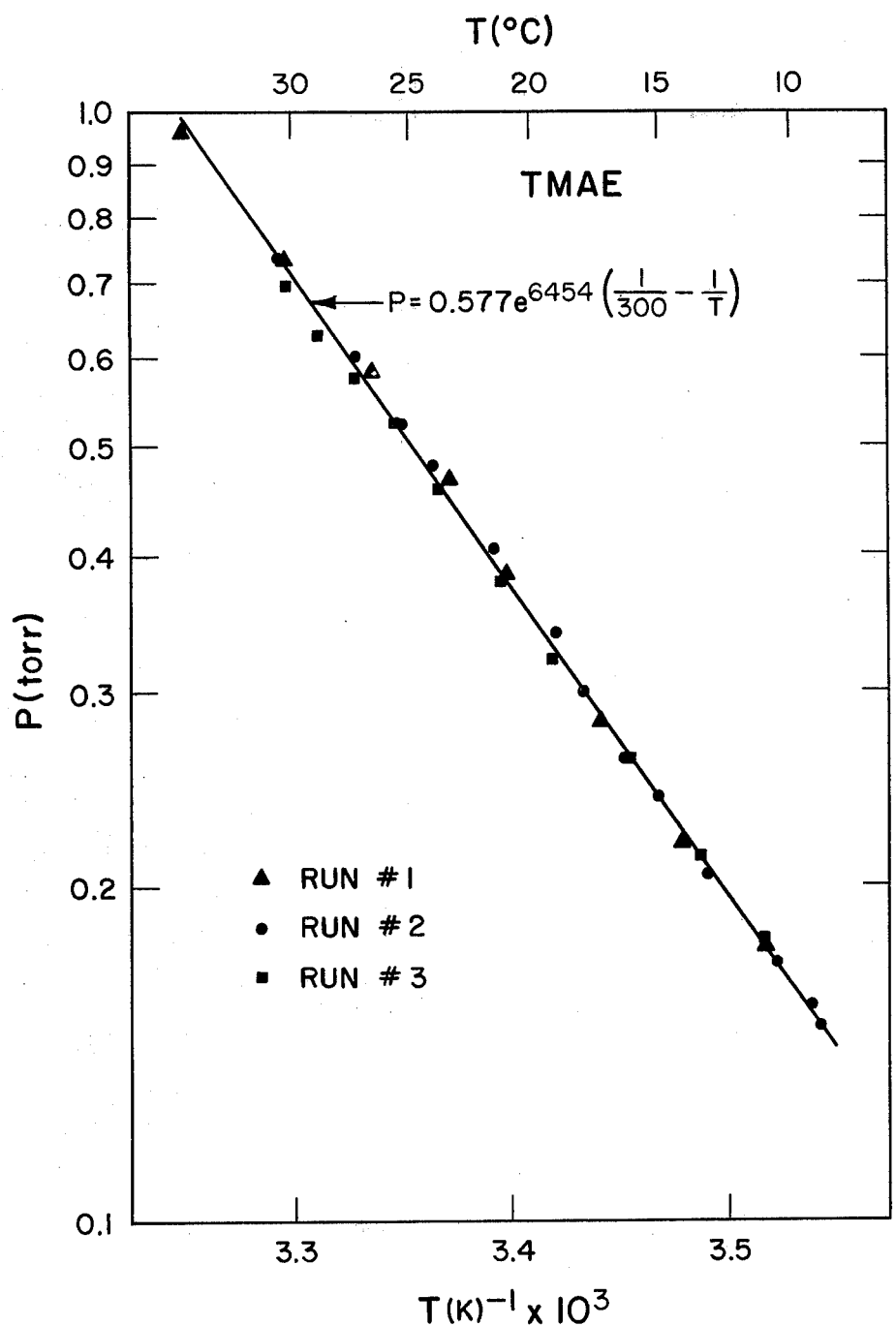
FIG. 6 is a graph of the vapor pressure of TMAE plotted against the reciprocal of the absolute temperature.

The measurements of vapor pressure of TMAE by V. N. Wiberg et al., Z. Naturforschg. 19b, 5 (1964) were quite discouraging, giving pressures of only 0.01 torr and 0.9 torr at 30° C. and 90° C., respectively. These pressures were found to be inconsistent with use of the gas. Consequently, independent measurements were made which are illustrated in FIG. 6. In making these measurements, a calibrated MKS Baratron with a 3 torr head and a calibrated thermometer with 0.1° C. divisions were used. The system was kept at an elevated temperature (greater than or equal to 50° C.), and the TMAE sample was kept in a water bath to control the temperature of the sample. Three sets of data were taken, as illustrated in FIG. 6, using two samples of TMAE. FIG. 6 shows the vapor pressure (P) plotted versus the reciprocal of the absolute temperature (T) and the temperature in degrees Centigrade. Vapor pressure at room temperature (20° C.) was found to be approximately 0.35 torr.

The present invention therefore provides an improved photoionization detector in a device for detecting x-rays which provides a substantial improvement in energy resolution over prior art devices. The photoionization detector of the present invention can be used to replace photomultiplier tubes and can provide a device which can be constructed with a variety of window dimensions in a more rugged and more compact manner than photomultiplier tubes. Additionally, the photoionization detector of the present invention can be constructed at a lower cost than the photomultiplier tubes having equivalent window area and is solar blind, thereby eliminating light leak problems often encountered with photomultiplier tubes. The device of the present invention can be used where high or varying magnetic fields exist and the quantum efficiency across the window of the photoionization detector of the present invention is uniform, unlike that of the photomultiplier tube. The TMAE gas of the present invention can be used with imaging photoionization detectors to give event location with high accuracy which is useful for Cerenkov radiation imaging and the production of an imaging gas scintillation proportional counter.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A detection gas for use in a photoionization detector comprising:
   a tetraaminoethylene having an ionization potential below 6.22 eV.

2. The detection gas of claim 1 wherein said tetraaminoethylene comprises at least in part tetrakis(dimethylamino)ethylene.

3. The detection gas of claim 1 wherein said tetraaminoethylene comprises at least in part 1,1',3,3'-tetramethyl-2,2'-biimidazolidinylidene.

4. The detection gas of claim 1 wherein said tetraaminoethylene comprises at least in part 1,1,4,4-tetrakis(dimethylamino)butadiene.

5. The detection gas of claim 1 wherein said tetraaminoethylene comprises at least in part N,N,N',N'-tetramethyl-p-phenylenediamine.

6. In a photoionization detector for converting incident ultraviolet photons to electrons, a detecting gas comprising at least in part:
   tetrakis(dimethylamino)ethylene.

7. In an imaging photoionization detector for converting ultraviolet photons generated by a gas scintillation proportional counter to electrons, a detector gas comprising at least in part:
   tetrakis(dimethylamino)ethylene.

8. A device for detecting x-rays comprising:
   gas scintillation proportional counter means for generating ultraviolet photons in response to said x-rays;
   photoionization detector means disposed proximate to said gas scintillation proportional counter for converting said ultraviolet photons generated by said gas scintillation proportional counter to electrons using a detection gas comprising at least in part tetrakis(dimethylamino) ethylene.

9. A device for generating an electrical signal representative of an image of a source of x-rays comprising:
   an x-ray imaging device;
   gas scintillation proportional counter means for generating ultraviolet photons in response to x-rays imaged by said x-ray imaging device, said gas scintillation proportional counter means disposed at the focal plane of said x-ray imaging device;
   imaging photoionization detector means for converting said ultraviolet photons to an electrical signal representative of an image of said source of x-rays using a detection gas comprising at least in part tetrakis(dimethylamino)ethylene, said imaging proportional counter means disposed proximate to said gas scintillation proportional counter means.

* * * * *

UNITED STATES PATENT AND TRADEMARK OFFICE
CERTIFICATE OF CORRECTION

PATENT NO. : 4,429,228

DATED : January 31, 1984

INVENTOR(S) : David F. Anderson

It is certified that error appears in the above-identified patent and that said Letters Patent is hereby corrected as shown below:

Front Page, left column, the line identifying the assignee should read;

-- [73] Assignee: The United States of America as represented by the United States Department of Energy --.

Front Page, right column, the line identifying the Attorney should read:

-- Attorney, Agent or Firm - Robert W. Weig, Paul D. Gaetjens and Richard G. Besha --

Signed and Sealed this

Twentieth Day of November 1984

[SEAL]

Attest:

GERALD J. MOSSINGHOFF

Attesting Officer

Commissioner of Patents and Trademarks